United States Patent [19]

Boilen

[11] Patent Number: 4,875,314
[45] Date of Patent: Oct. 24, 1989

[54] CONNECTION SYSTEM FOR PREVENTING UPLIFT OF SHEAR WALLS

[76] Inventor: Kenneth T. Boilen, 4 Allemand La., San Anselmo, Calif. 94960

[21] Appl. No.: 707

[22] Filed: Jan. 6, 1987

[51] Int. Cl.⁴ .............................................. E04H 9/02
[52] U.S. Cl. ................................... 52/167 R; 52/741; 52/726; 52/227; 52/236.7; 52/274
[58] Field of Search ............. 52/227, 228, 726, 236.6, 52/274, 236.9, 236.7, 741, 238.1, 240, 229, 223 R, 167

[56] References Cited

U.S. PATENT DOCUMENTS

| | | | |
|---|---|---|---|
| 271,776 | 2/1883 | Blanchard | 52/223 R |
| 573,452 | 12/1896 | Delahunt | 52/274 |
| 575,209 | 1/1897 | Bruckner | 52/240 |
| 1,166,987 | 1/1916 | Hedrick | 52/227 |
| 1,251,230 | 12/1917 | Holland et al. | 52/227 |
| 1,753,451 | 4/1930 | Tonnelier | 52/227 |
| 1,803,168 | 4/1931 | Burgen | 52/274 |
| 2,137,767 | 11/1938 | Betcone | |
| 2,649,625 | 8/1953 | Johnson | 52/293 |
| 2,803,856 | 8/1957 | Kofahl et al. | 52/227 |
| 2,929,236 | 3/1960 | Steward et al. | 52/228 |
| 3,355,853 | 12/1967 | Wallace | 52/236.6 |
| 3,429,092 | 2/1969 | Perry et al. | 52/236.7 |
| 3,780,480 | 12/1973 | Cvijanovic et al. | 52/227 |
| 3,782,061 | 1/1974 | Minutoli et al. | 52/227 |
| 4,321,776 | 3/1982 | Delight | 52/167 |
| 4,416,097 | 11/1983 | Weir | 52/236.7 |
| 4,472,916 | 9/1984 | Krebs | 52/227 |
| 4,688,362 | 8/1987 | Pedersen et al. | 52/227 |

FOREIGN PATENT DOCUMENTS 767330 10/1980 U.S.S.R. ................. 52/167

OTHER PUBLICATIONS

Simpson Catalog 86H-1, Copyright 1986, pp. 1, 3, 6, 7.
Silver Metal Products Inc. Catalog, copyright 1985, pp. 1, 46, 47.

Primary Examiner—Carl D. Friedman
Assistant Examiner—Caroline D. Dennison
Attorney, Agent, or Firm—Owen, Wickersham & Erickson

[57] ABSTRACT

A structural connection system for resisting uplift loads on the shear walls for each level of a wood frames structure includes anchors for each level. The system, employed at least at the lateral ends of the shear walls, compressively restrains the shear walls against upward movement. The anchors, which are vertically aligned, are coupled to one another through tie rods. A tie rod connects the anchor for the bottom floor to a foundation anchor embedded in the foundation. The anchors and tie rods are positioned between pairs of closely spaced vertical framing elements, such as studs. Uplift loads for each level are transferred to the foundation through the connection system. This eliminates any accumulation of uplift loads from level to level.

16 Claims, 5 Drawing Sheets

CONNECTION SYSTEM FOR PREVENTING UPLIFT OF SHEAR WALLS

BACKGROUND OF THE INVENTION

The present invention relates to a structural connection system specially suited for wood frame construction to resist uplift loads created by wind or earthquake forces acting on the structure.

The state of the art and the practice of engineering today provides an accepted method of analysis to determine the lateral forces created and their distribution within wood frame structures due to earthquakes and wind loads. See the chapter entitled "Design Lateral Forces" at pages 173-195 of the Western Woods Use Book, published by Western Woods Products Association, ®1973. Common practice provides for lateral force-resisting elements, called shear walls, in the structures. Shear walls, which may or may not be vertically aligned, are standard wood framed walls sheathed with plywood. The plywood is of a particular grade and species and is nailed in a specific pattern with certain sized nails to achieve the desired strength. Wind loads, earthquakes and other horizontal forces exerted on such a building are transferred through the horizontal floor framing elements (including floor sheathing, joists, etc.) to shear walls extending generally parallel to the direction of the force. These loads introduce vertical forces in the shear walls called uplift loads. These uplift loads create a tendency for the shear walls to lift or move vertically upwardly at one end of the shear wall. The uplift loads tend to lift the shear walls away from the foundation and away from any underlying shear wall.

In this application a structural framing element will often be referred to simply as a stud for ease of reference. However, use of such term is not limiting in any sense.

To resist this uplift load a conventional practice has been to secure the lower ends of the structural framing elements, typically studs and posts, at the shear wall ends (and/or along the length of the shear wall if desired) to the structural framing elements of the next lower level (or directly to the foundation for the bottom level). This has been accomplished using hold-down devices such as are described in U.S. Pat. No. 4,192,118 and U.S. Design Pat. No. D-224,083. Conventional hold-down devices commonly use L-shaped brackets having bolt holes in each leg. The L-shaped bracket is secured to the lower end of a stud (or other structural framing element) by bolts which pass through horizontal holes in the stud. Another bracket is mounted to the upper end of a stud in the underlying level in a similar manner. The two brackets are secured to one another by a rod passing through the floor framing space between the levels. This permits uplift loads to be transferred from one level to the underlying level.

This type of system, although helpful, may not be totally satisfactory in many circumstances. The uplift loads transferred between levels are applied to the ends of the studs at the horizontal holes. The stress concentration at these points creates the potential for the bolts of the hold-down devices to pull out of the ends of the studs. This is especially true at the lower levels where the uplift loads from the overlying levels are cumulatively applied to the ends of the studs. Also, the need to drill horizontal holes in the studs often creates installation problems due to the tight spacing which often exists. Because of the method by which the L-brackets are secured to the studs, play can exist in the connections which reduces the rigidity, and thus the effectiveness, of the system. Another disadvantage is that conventional hold-down devices require quite accurate placement of the brackets and holes, which is difficult to accomplish at the construction site.

SUMMARY OF THE INVENTION

The present invention is directed to a structural connection system specially suited for wood frame construction to resist uplift loads created by the action of wind or earthquake forces acting on the structure. The system resists the uplift forces at the upper ends of each level of shear walls (or other vertical framed force-resisting elements). This is accomplished by providing compressive restraint directly above the shear walls at each level. It is preferred that the compressive restraint be provided to the shear walls at the lateral ends of the shear walls for greatest effectiveness. However, a system of compressive restraint according to the invention can be used at intermediate positions along the shear wall, preferably in addition to the use at the shear wall ends.

The compressive restraint is provided by elements called anchors. The anchors are coupled together by tie rods having great strength in tension. The tie rod at the bottom level is fastened to the foundation of the structure. The tie rods are generally vertical; a slope of up to 4% is presently considered satisfactory. The uplift forces are transferred from each level to the anchors, from the anchors to the tie rods and through the tie rods to the foundation. That is, the uplift load at each level is transferred directly to the foundation through the tie rods, not through the framing of the adjacent levels. The system relies on the bearing capacity of the structural framing members at the anchors; the system also relies on the strength of the tie rods in tension to transfer the uplift loads at each level to the foundation rather than the conventional reliance upon the strength of the studs where they are connected to the L-brackets. The tie rods can be, for example, steel or high strength structural plastic.

One aspect of the invention is the recognition that the systems used heretofore to resist uplift loads transferred the uplift loads through the vertical framing elements. Since the load for each level, with prior art systems, is transferred to the adjacent level through the vertical framing elements themselves, a multiplication of the uplift forces on the vertical framing elements resulted. That is, the shear wall of the bottom level was placed in tension with an accumulated uplift force generated by each level above. Therefore the hold-down brackets at the bottom level and the studs to which they were typically secured were required to resist this cumulative uplift force.

The present invention transfers the uplift load at each level to the foundation by compressively restraining the upper ends of the shear walls, preferably at least at the lateral ends of the shear walls, using a variety of different types of anchors. The anchors, in the preferred embodiment, are connected in series by number of tie rods, the bottom tie rod being secured to a foundation anchor. Thus the anchor for the top level of the structure resists the uplift load at that level by compressively restraining the top, typically the top edge, of the vertical framing elements at the shear wall. That anchor is connected to the anchor for the floor immediately below through a tie rod. This second anchor also compressively restrains the top of its associated shear wall so that the uplift forces from such shear wall are exerted on its associated anchor. This continues through the bottom level of the building at which the tie rod is connected to the foundation anchor, typically through a coupler. The foundation anchor is the only anchor which does not compressively engage the upper end of a shear wall. The invention thus eliminates the primary failure mechanism of conventional hold-down brackets where the horizontally extending bolts may pull out of the ends of the studs (or posts at high loads).

In the preferred embodiment there is what is called a top anchor, a bottom anchor and an intermediate anchors. Each of these anchors, preferably, is made in part from a similar element called a coupler. The coupler has a pair of spaced-apart U-brackets with the bight of each U facing one another. The U-brackets are connected by a pair of side plates. Each U-bracket has a hole through the bight of the U through which ends of opposed tie rods can pass. Such a coupler is typically used to connect the ends of the tie rods to one another. These connections are typically threaded; other mechanical fasteners could be used as well.

The bottom anchor and the top anchor are structurally quite similar in that they have a base plate mounted to one end of the coupler. They are named according to which end of the vertical framing members they are mounted adjacent to. In one embodiment the base plate of a bottom anchor can be sized so that the base plate fits between a pair of vertical framing elements but does not extend between the ends of the framing elements and the bottom plate. This embodiment is used for most load conditions. In another embodiment the base plate is sized to fit between the ends of a pair of closely spaced vertical framing members, typically studs or posts, and the dual top plates (for top anchors) or the bottom plate (for bottom anchors). This embodiment of bottom anchor is used for higher load applications since it provides a greater surface area for pressing against the bottom plate (for bottom anchors).

The top and bottom anchors are preferably mounted between two closely spaced vertical framing elements, typically studs. Doing so provides a uniform distribution of the load and substantially eliminates eccentric forces on the vertical framing elements and on the connection system.

The top anchor, so named because it is mounted adjacent the top ends of the framing members, compressively restrains the upper ends of the vertical framing members. The bottom anchor resists the uplift forces from the shear wall below through the bottom plate, the floor sheathing the floor joists and the dual top plates; these framing elements are all placed in compression by the uplift forces of the underlying shear wall being resisted by the bottom anchor.

There is a special type of top anchor, called the topmost anchor, which can be used at the top level. The topmost anchor, typically a flat plate with a hole in it, is positioned above the dual top plates of the top level to apply the desired compressive restraint on the shear wall of the top level. The topmost anchor needs no coupler since there is no overlying tie rod to connect to.

The intermediate anchor is similar to the top and bottom anchors but includes a base plate at each end. The intermediate anchor is mounted below the floor sheathing and above the dual top plates between two levels so it is the same height as the floor joists. The intermediate anchor resists the uplift forces from the underlying shear wall through the dual top plates directly beneath it.

An advantage of the invention over conventional systems is its field flexibility. That is, the precise location of the hardware and holes is not nearly so critical as it is with conventional L-bracket hold-down devices. This saves installation time and helps to lower the cost of construction. Also, looseness or play, which can exist with prior art L-bracket hold-down systems can be easily eliminated with the invention because of the lack of horizontally extending bolts or like members.

Other features and advantages of the invention will appear from the following description in which the preferred embodiments have been set forth in detail in conjunction with the accompanying drawings.

DETAILED DESCRIPTION OF THE PREFERRED EMBODIMENT

Figures 1, 2, 4:
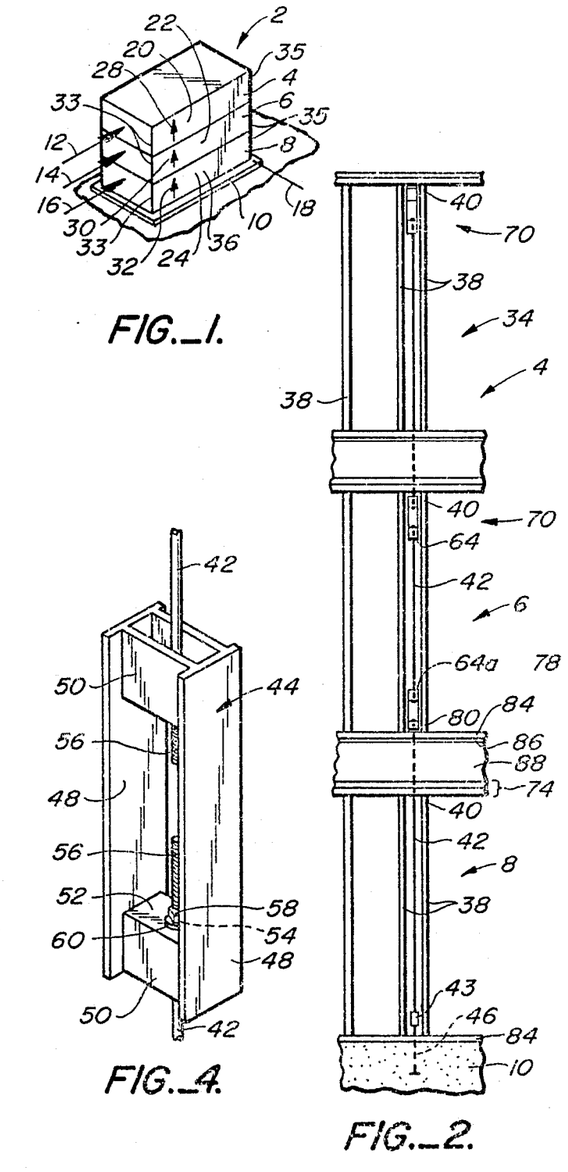
FIG. 1 is a schematic representation of a three-level building showing wind loads on the three levels.
FIGS. 2 and 3 are simplified side elevations of the building of FIG. 1 with the wall sheathing removed illustrating a connection system made according to the invention.
FIG. 4 is an isometric view of a coupler.

Referring now to FIG. 1, a building 2 is shown having three levels, a top level 4, an intermediate level 6 and a bottom level 8, bottom level 8 being positioned on foundation 10. In this preferred embodiment one level is one floor but a level can refer to more than one floor as well. Schematically represented by arrows are lateral loads 12, 14 and 16 exerting horizontal forces on top, intermediate and bottom levels 4, 6, 8. These lateral loads, which could result from earthquakes or from wind loads on building 2, can be thought of as tending to pivot building 2 about its back edge axis 18. As a result the shear walls, in this simplified example illustrated by outer shear walls 20, 22, 24, have a tendency to lift up away from any underlying levels 6, 8 and from foundation 10. The present invention helps to counteract the resulting uplift loads 28, 30, 32 at each level 4, 6, 8 by transferring these uplift loads directly to foundation 10.

Turning now to FIG. 2, a first embodiment of connection system 34 is shown in conjunction with the top, intermediate and bottom levels 4, 6, 8 of building 2 of FIG. 1. Although only one connection system 34 is shown, multiple systems 34 would typically be used according to the loads 12, 14, 16 expected. Preferably connection systems 34 would be at least at shear wall lateral ends 33, 35 for the greatest effectiveness. Each of shear walls 20, 22 and 24 includes outer shear wall sheathing 36, which has been removed in FIG. 2 for clarity, and studs 38 as the structural framing members. System 34 includes broadly various types of anchor elements, discussed below, installed within building 2 so to restrain upper ends 40 of studs 38 at each level 4, 6, 8. The various anchor elements are coupled to one another by tie rods 42, the tie rod at bottom level 8 being connected to foundation 10 through a simple threaded coupler 43 and a foundation anchor 46. The various configurations of the anchor elements will now be discussed.

FIG. 4 shows a coupler 44 to include a pair of side plates 48 having two spaced-apart U-brackets 50 mounted between and at either end of the plates 48. The bights 52 of the brackets 50 have holes 54 formed in them for receipt of threaded ends 56 of tie rods 42. Coupler 44 thus allows the opposed threaded ends 56 to be secured to one another using nuts 58 and washers 60. Although coupler 44 can be used to secure the bottom tie rod 42 to foundation anchor 46, a simpler and less expensive conventional threaded coupler 43 is preferably used there. Coupler 44 can also be used to splice together opposed ends of tie rods 42 to permit the passage of a pipe through the wall which would otherwise intersect a continuous tie rod 42 (not shown). However, the main use for coupler 44 is as part of anchor elements 64 and 64a discussed below.

Figure 5:
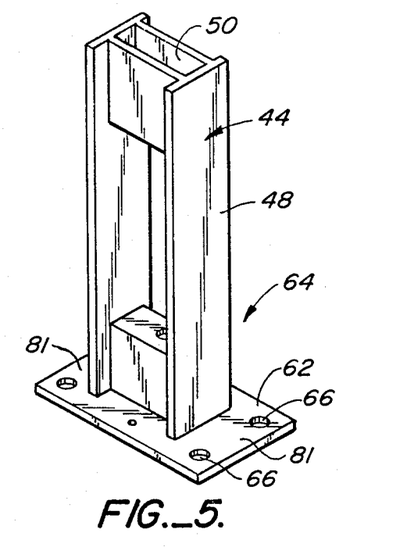
FIGS. 5 and 5B are isometric views of couplers combined with two different sized base plates to form two different anchors.

Turning now to FIG. 5, coupler 44 is shown with a base plate 62 secured to one end to create an anchor element 64. Base plate 62 has several holes 66 for the passage of nails 68 as discussed with reference to FIG. 5A.

Figure 5A:
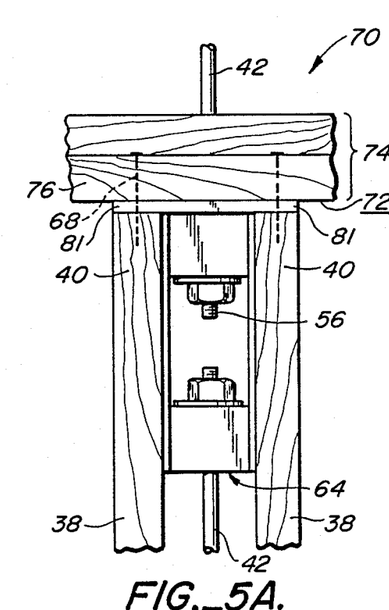
FIGS. 5A and 5C are side views showing the anchors of FIGS. 5 and 5B being used as a top anchor and a bottom anchor respectively.

Referring now to FIG. 5A, anchor element 64 is shown being used as a top anchor 70. Note that top anchor 70 is found at both top level 4 and intermediate level 6 in FIG. 2. When anchor element 64 is used as top anchor 70, portions 81 of base plate 62 are positioned between upper ends 40 of a pair of closely spaced studs 38 and the lower surface 72 of a dual top plate 74. During construction anchor element 64 is secured in position by nails 68 passing through the lower top plate 76 and holes 66. Top anchor 70 resists the uplift load of the shear wall, of which the pair of closely spaced studs 38 is a part, by acting to restrain any vertically upward motion of studs 38 by the restraint of the studs through their upper ends 40.

Figure 5B:
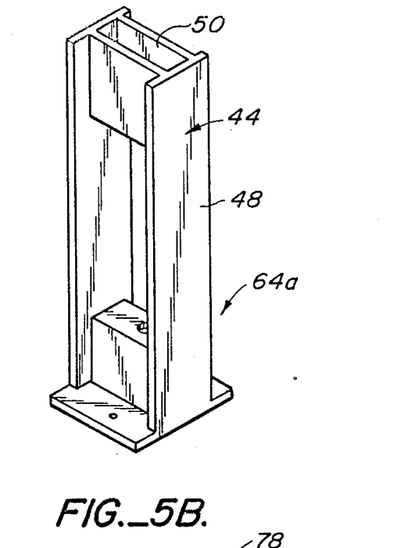
Figure 5C:
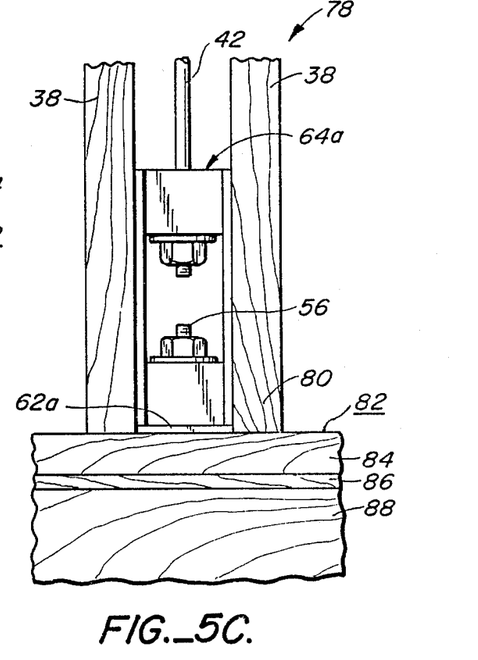

At FIG. 5B an anchor element 64a is shown. FIG. 5C shows anchor element 64a used as a bottom anchor 78. Anchor element 64a is like anchor element 64 except that side portions 81 of base plate 62 of element 64 are removed so that the resulting base plate 62a fits between studs 38. Anchor element 64a is used as bottom anchor 78 under normal loading conditions while anchor element 64 can be used as bottom anchor 78 under high load conditions because of its greater bearing surface area. At FIGS. 2 and 3 bottom anchor elements 64a are used as bottom anchors 78 adjacent the lower or bottom ends 80 of pairs of closely spaced studs 38 at intermediate level 6 and upper level 4, respectively. Bottom anchor 78 in FIG. 2 is the anchor which restrains the bottom uplift load 32 in bottom level 8. The bottom anchor 78 of FIG. 2 resists bottom uplift load 32 by restricting the upward movement of bottom plate 84, floor sheathing 84, floor joists 88, dual top plate 74 and the studs below.

Note that a pair of closely spaced studs 38 are used on either side of top and bottom anchors 70, 78 and tie rods 42. This is important to balance the load applied to connection system 34 by shear walls 20, 22, 24 to reduce or eliminate eccentric components.

Figure 3:
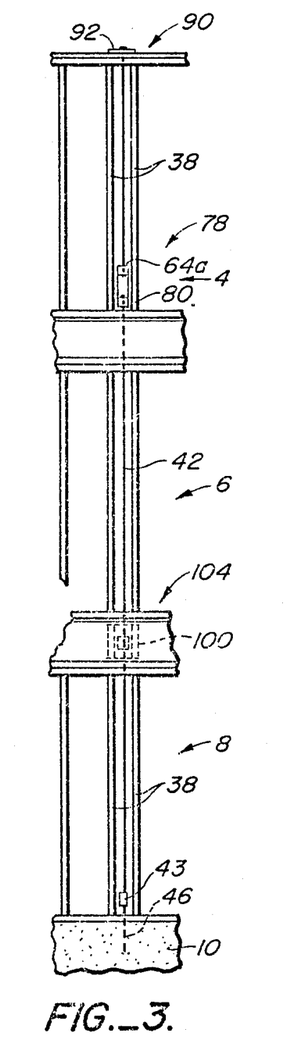
Figures 6, 7, 8:
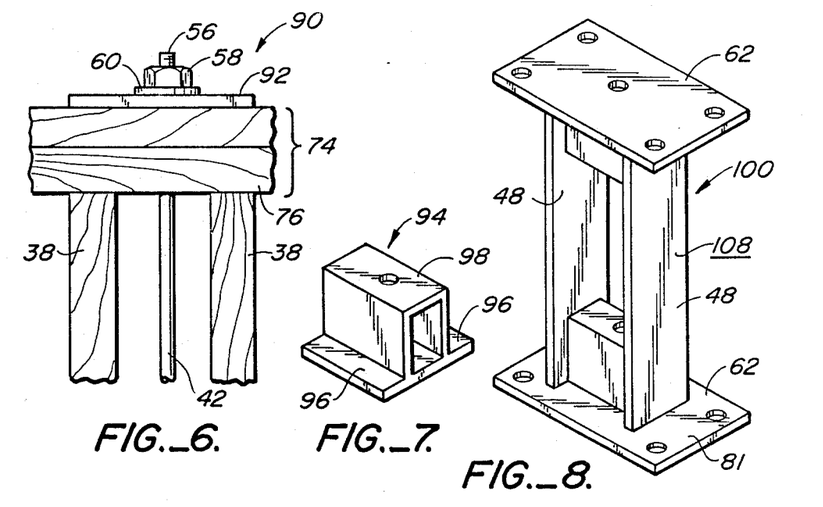
FIG. 6 shows a rectangular base plate and used as a topmost anchor.
FIG. 7 shows a topmost anchor element including a base plate and a U-bracket.
FIG. 8 is an isometric view of an intermediate anchor element similar to the anchor element of FIG. 5 but with two base plates.

Referring now to FIGS. 3 and 6, a topmost anchor 90 is shown to be a simple rectangular base plate 92 having a centrally located hole for receipt of the threaded end 56 of the top tie rod 42. This type of anchor can only be used at a top level 4 because of its inability to be coupled to any overlying tie rod 42.

Figure 7A:
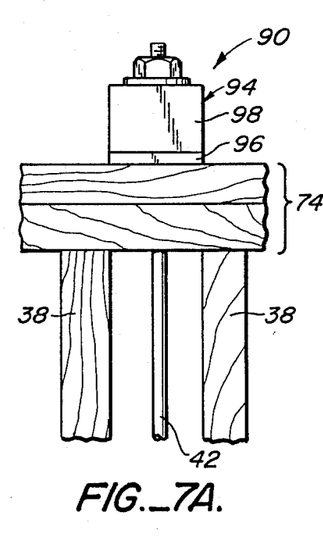
FIG. 7A shows a topmost anchor element of FIG. 7 being used as a topmost anchor.

FIG. 7 shows another topmost anchor element 94 including a rectangular base plate 96 and a U-bracket 98. At FIG. 7A topmost anchor element 94 is seen used as a topmost anchor 90 above dual top plate 74 of top level 4.

Referring now again to FIG. 2, top anchor 70 for top level 4 could be modified so that the U-bracket 50 adjacent base plate 62 is eliminated (not shown). This is possible since top anchor 70 at top level 4 acts as a topmost anchor 90 and therefore is not coupled to any overlying tie rod 42.

Figure 8A:
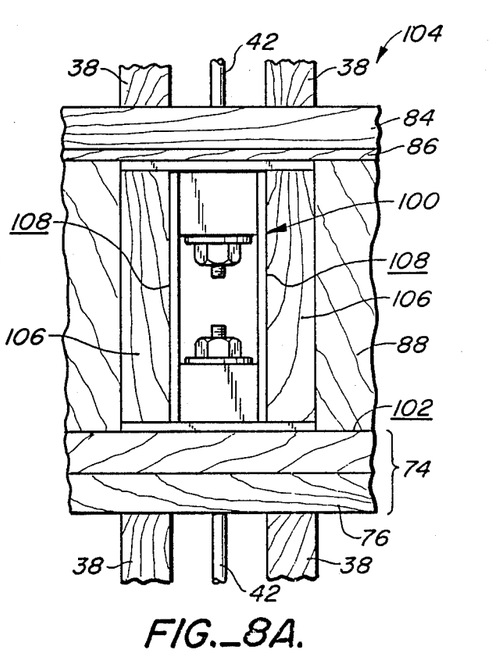
FIG. 8A shows the intermediate anchor element of FIG. 8 in use.

FIG. 8 shows an intermediate anchor element 100. Element 100 is essentially the same as anchor element 64 shown in FIG. 5 but has a base plate 62 at each end. Element 100 is approximately the same height as floor joists 88 so to fit between floor sheathing 86 and the upper surface 102 of dual top plate 74. Intermediate anchor 104, see FIGS. 3 and 8A, acts similarly to bottom anchor 78 by restraining dual top plate 74 against studs 38. Wood blocking 106 is positioned adjacent the outer surfaces 108 of side plates 48 to provide additional compression strength for intermediate anchor 104.

Figure 9:
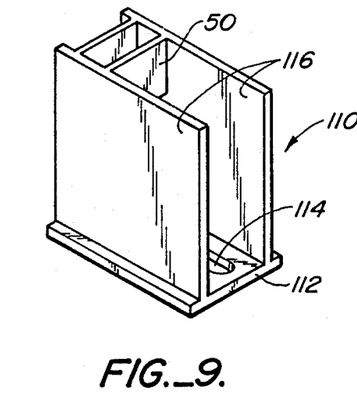
FIG. 9 is an isometric view of an offset foundation coupling.
Figure 9A:
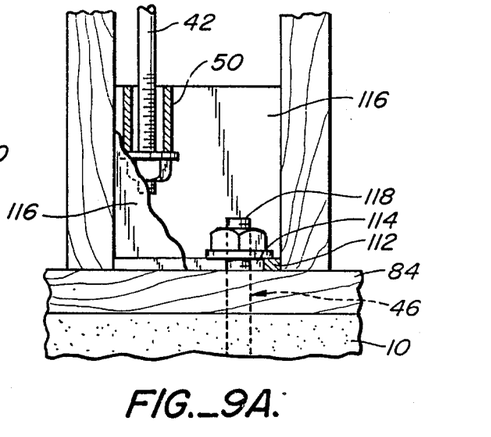
FIG. 9A is a side view of the offset foundation coupling of FIG. 9 in use.

On occasion a foundation anchor 46 may be somewhat mispositioned and thus not be vertically aligned with the overlying tie rod 42 at bottom level 8. In these circumstances an offset foundation coupling 110, shown in FIGS. 9 and 9A, can be used instead of single coupler 43. Offset foundation coupling 110 includes a base plate 112 having an elongate slot 114 therein along one side. A U-bracket 50 is mounted offset from slot 114 and between a pair of side plates 116. This permits coupling the threaded end 118 of foundation anchor 46 with the threaded end 56 of an overlying but offset tie rod 42 as shown in FIG. 9A.

Figures 10A, 10B, 10C:
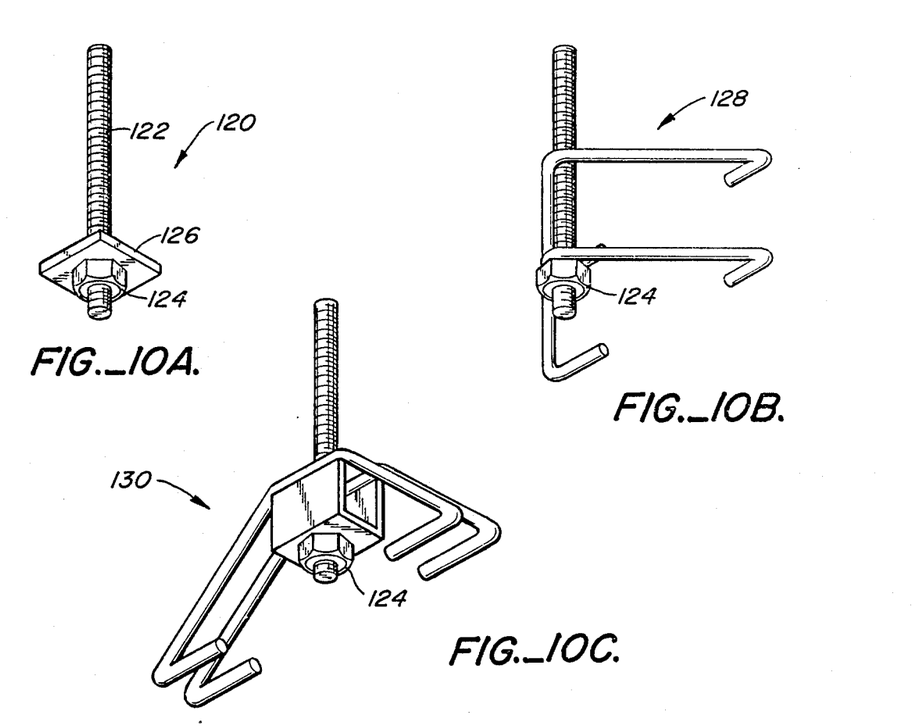
FIGS. 10A, 10B and 10C illustrate three different types of foundation anchors.

In FIGS. 10A, 10B and 10C three different foundation anchor elements 120, 128, 130 are shown. Foundation anchor element 120 includes a threaded rod 122 to which nut 124 is attached as lower end. An apertured plate 126 is positioned above the bolt. Nut 124, plate 126 and a portion of rod 122 are positioned within concrete foundation 10 when it is poured. Foundation anchor elements 128, 130 of FIGS. 10B and 10C are used when additional pullout strength is required for foundation anchor 46. Other designs can be used as well.

Figure 11:
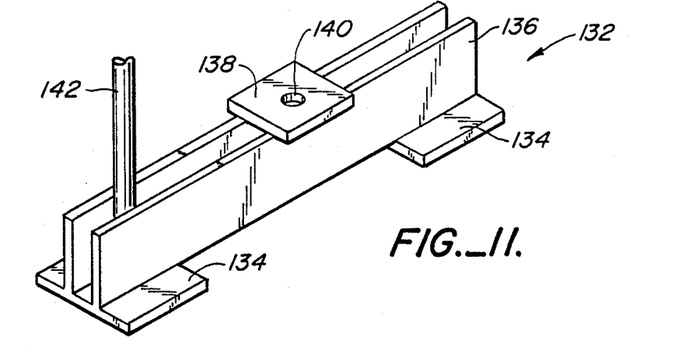
FIG. 11 shows an offset anchor element.
Figure 11A:
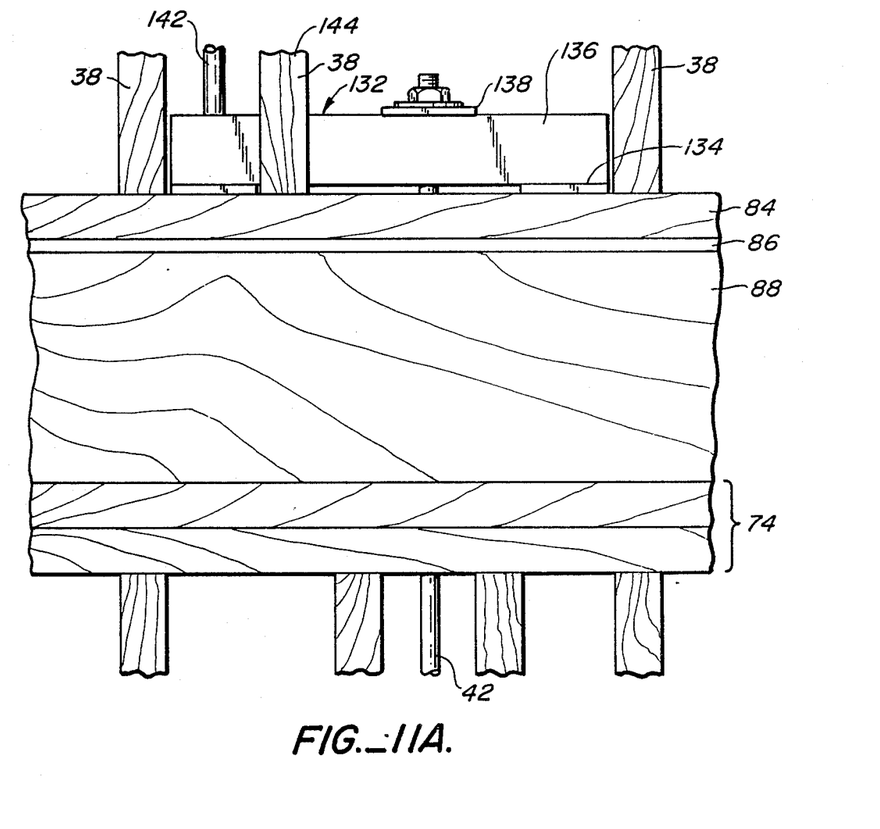
FIG. 11A shows the use of the offset anchor element of FIG. 11 coupling vertically offset tie rods.

Sometimes, due to building constraints, closely spaced parallel studs 38 cannot be exactly vertically aligned on adjacent levels. In this situation an offset anchor element 132, shown in FIG. 11, can be used. Element 132 includes a pair of base plates 134 and what is essentially a laterally elongate U-bracket 136. The bight 138 of U-bracket 136 has a hole 140 for the passage of a tie rod 42 from below as shown in FIG. 11A. A specialized tie rod 142 extends upwardly from the base plate 134 at one end of offset anchor element 132, tie rod 142 being secured to the base plate such as by welding. Of course specialized tie rod 142 could be replaced by a conventional tie rod 42 if desired. In the embodiment of FIG. 11A the top center stud 144 has been notched (not shown) to allow the passage of elongate U-bracket 136.

Although connector system 34 can be added to an existing building, it is preferably installed during the construction of building 2. Foundation anchors 46 are properly positioned and are partially embedded within foundation 10 when the foundation is poured. During construction pairs of closely space studs 38 are installed at each level on each side of a vertical center line (not shown) extending from foundation anchor 46. Also during construction holes are drilled in bottom plate 84, floor sheathing 86 and dual top plates 74 coaxial with the vertical center line extending upwardly from foundation anchor 46. Tie rods 42 are passed through the holes and appropriate anchor elements, such as anchor elements 64, 64a, 94 and 100 of FIGS. 2 and 3, are secured to the tie rods by nuts 58 and washers 60. Once in position the various nuts 58 are tightened to snug the respective anchors against the structural elements of the building. (Nuts 58 are typically tightened working from the bottom to the top of the building.) The anchor for each level restrains vertical movement of the level immediately below and transfers the uplift forces of such level directly to the foundation through tie rods 42, couplers 44 and foundation anchor 46 without the uplift forces being exerted on the structural members of the building for any of the other levels.

Modification and variation can be made to the disclosed embodiments without departing from the subject of the invention as defined in the following claims. For example, the preferred embodiments have been discussed with reference to a building having three levels. The invention can be used with a greater or lesser number of levels as well. Anchor elements, such as elements 64, 64a, and 100, are preferably made of metal but could be made of other materials as well. Although the various elements are, in the preferred embodiments. often secured to one another by threaded elements, other types of connect can also be used. It is preferred to use an anchor for each level; however, under appropriate circumstances an anchor may not be used for any particular level.

I claim:

1. For use in a wood framed building of the type including a foundation and first and second levels supported on the foundation, the first and second levels including top and bottom pairs of vertical frame members, horizontal plate members connecting the upper ends of said vertical frame members at both said first and second levels, and sheathing means fixed to said members forming vertical shear walls, said shear walls including upper and lower ends, each of the levels separated by a floor, the floor comprising floor framing, a connecting system for preventing the uplifting of said shear walls from said foundation due to lateral loads induced into the building, the system comprising:

foundation anchor means secured to the foundation and generally vertically aligned with the anchor means; and a first upper anchor means having coupling means at both ends and a bearing member base plate at its lower end supported on the horizontal plate member of said first building level;

a second upper anchor means vertically aligned with said first upper anchor means and having a bearing base plate member at its lower end supported on the horizontal plate of said second building level;

tie rods means located between vertically aligned pairs of vertical frame members for tensively coupling said first and second upper anchor means to one another and to said foundation anchor, whereby vertical uplift loads induced by lateral forces transferred into the first and second level shear walls are transferred to their respective anchor means which in turn transfer the vertical uplift loads to the foundation through the tie rod means and the foundation anchor.

2. The apparatus of claim 1 wherein said first upper anchor means includes parallel, spaced apart, vertically positioned side plates and spaced apart U-shaped support members secured to and located between the side plates at their opposite ends, the support members having holes for the passage of ends of the tie rods therethrough, an anchor plate secured to one end of the side plates and adapted to bear against a horizontal plate member of a shear wall.

3. The connection system of claim 1 wherein the first and second levels are adjacent levels.

4. The connection system of claim 1 wherein the first level is the bottom level of the structure.

5. The connection system of claim 1 wherein the second level is the top level of the structure.

6. The apparatus of claim 1 wherein the coupling means includes parallel, spaced apart, vertically positioned side plates and spaced apart U-shaped support members secured to and between the side plates at their opposite ends, the support members having holes for the passage of ends of the rods therethrough.

7. The apparatus of claim 1 wherein the anchor means is sized for mating engagement between the top pair of vertical frame members.

8. The apparatus of claim 1 wherein the anchor plate is positioned above and against the floor framing of a chosen floor.

9. The apparatus of claim 1 wherein the foundation anchor includes a vertically extending threaded bolt.

10. The apparatus of claim 1 including anchor means for three levels.

11. The apparatus of claim 1 wherein the anchor means includes portions mounted between the upper ends of the vertical frame members and the floor framing of an overlying floor.

12. The apparatus of claim 1 wherein the anchor means includes portions mounted between the lower ends of the vertical frame members and the floor framing of an underlying floor.

13. A connection system for use in a wood framed building structure of the type including at least one level and comprised of a foundation, a series of vertical wood frame members including pairs of closely spaced stud members resting on the foundation, a horizontal plate member attached to the upper ends of the vertical members, sheathing means fastened to said members to form a vertical shear wall for at least one level, the vertical shear wall including upper and lower ends, a connection system for preventing the uplifting of said wall due to lateral loads induced into the building comprising:

anchor means located between but unattached to related pairs of vertical closely spaced stud members in the shear wall, said anchor means having a bearing plate at one end for exerting a compressive force on the upper ends of an adjacent related pair of said stud members located on opposite sides of the anchor means;

a foundation anchor secured to the foundation and generally vertically aligned with the upper anchor means; and tie rod means extending between and parallel to said pair of vertical stud members for coupling the anchor means to the foundation anchor and thereby compressively restraining the upper end of the shear wall, whereby vertical uplift loads induced by lateral forces transferred into the shear wall are transferred to the anchor means which in turn transfers the vertical uplift loads to the foundation through the tie rod means and the foundation anchor.

14. The apparatus of claim 13 wherein the tie rod means includes steel rods and fasteners for securing opposed ends of the steel rods to the anchor means.

15. A connection system for use in a wood framed building structure of the type including at least one level comprised of a foundation, a series of spaced apart vertical members supported on an extending above said foundation including at least one pair of relatively closely spaced studs, horizontal top plate means attached to the upper ends of said vertical members and sheathing means attached to said vertical members to form a shear wall therewith, said connection system comprising:

an upper anchor means located on a vertical line between said closely spaced studs above said top plate means and having a base member at its lower end that bears upon said top plate;

a lower anchor means located between said closely spaced studs and secured to said foundation;

tie rod means connected to said lower anchor means, extending parallel to and between said closely spaced studs and attached to said upper anchor means; and fastener means at the upper end of said tie rod means for forcing said base member of said upper anchor means to bear firmly against said top plate and exert a compressive force on the closely spaced studs on opposite sides of said tie rod means;

whereby said connection system provides an uplift restraint of said shear wall when the building structure is subjected to lateral loads.

16. A method for creating a connection system for use in wood framed structure to provide uplift restraining of vertical framed elements, the structures having a foundation and at least two levels of shear walls separated by floor, the walls each including horizontal plate members connected to the top ends of vertical members, the uppermost level covered by a ceiling, comprising the following steps:

securing a foundation anchor to the foundation;

positioning upper coupling anchors as sets between selected pairs of spaced apart, parallel, vertical support members for each level, the sets being generally vertically aligned with the foundation anchor;

extending a tie rod assembly between the sets of vertically aligned couplers from the foundation anchor to the ceiling;

securing the tie rod assembly to the foundation anchor;

causing said anchors at positions along the tie rod assembly to compressively engage said horizontal plate members of the walls; and securing said anchors to the tie rod assembly so they compressively restrain the vertical support members whenever the walls tend to exert uplift forces caused by lateral forces on the structure, said uplift forces being transferred to the foundation through the anchors, tie rod assembly and foundation anchor.

* * * * *